United States Patent Office 2,894,024
Patented July 7, 1959

2,894,024

2-AMINO-5-CHLORO-4-TOLYL PHOSPHONIC ACID

Karl C. Whitehouse, Somerville, and Hans Z. Lecher, Plainfield, N.J., assignors to American Cyanamid Company, New York, N.Y., a corporation of Maine No Drawing. Application March 12, 1957
Serial No. 645,409

5 Claims. (Cl. 260—500)

The invention relates to a new compound, 2-amino-5-chloro-4-tolyl phosphonic acid and its salts. It is an advantage of the present invention that the intermediate compound can be produced readily in good yield and that no problem of isomer formation is encountered when the preferred method of preparation is used.

When 2-amino-5-chloro-4-tolyl phosphonic acid is diazotized and coupled with β-naphthol, an azo dye is obtained from which lakes may be formed with polyvalent metals such as calcium, cadmium, and barium, which are red pigments with a very clear yellow tint and excellent transparency.

The color of the pigments obtained is a different red than the pigment produced from the corresponding 2-amino-5-chloro-4-toluene sulfonic acid. The color of the pigment is similar to a slightly different pigment, Lithol red, but shows markedly greater transparency.

The invention will be described in greater detail in conjunction with the following specific examples in which the parts are by weight unless otherwise specified.

*Example 1*

104 parts of 3-chloro-4-tolyl phosphonic acid is added to 700 parts of 95% nitric acid at 15-20° C. A yellow solution results which is stirred until nitration is complete and then poured into ice water. The 5-chloro-2-nitro-4-tolyl phosphonic acid produced is extracted with ether, recovered by evaporation, and 100 parts thereof dissolved in 550 parts of water and 4 parts of glacial acetic acid. This solution is slowly added to a slurry of 80 parts of iron powder and 750 parts of water containing 4 parts of glacial acetic acid, the slurry being heated to reflux and the addition being gradual with stirring. After all of the solution has been added, refluxing is continued until reduction is complete. This slurry is then cooled and filtered, the filter cake heated with 2 N sodium hydroxide solution and the resulting slurry filtered hot. The filter cake is then thoroughly washed with hot water. A tan-colored filtrate is obtained and is decolorized by boiling with charcoal, clarified, and made acid to Congo red paper with hydrochloric acid. 2-amino-5-chloro-4-tolyl phosphonic acid precipitates out and is recovered by filtration.

*Example 2*

To a solution of 8 parts of sodium hydroxide in 250 parts of water is added 22.2 parts of the product of Example 1, stirring until solution takes place. The resulting solution is then evaporated to dryness, leaving the disodium salt of 2-amino-5-chloro-4-tolyl phosphonic acid.

*Example 3*

The procedure of Example 2 is repeated, replacing the sodium hydroxide with a stoichiometrical amount of potassium hydroxide. The dipotassium salt of 2-amino-5-chloro-4-tolyl phosphonic acid is obtained. It, like the disodium salt, is water-soluble.

*Example 4*

The procedure of Example 2 is repeated, replacing the sodium hydroxide with a stoichiometrical amount of ammonium hydroxide. The diammonium salt of 2-amino-5-chloro-4-tolyl phosphonic acid is obtined in the form of a water-soluble white solid.

*Example 5*

The procedure of Example 2 is repeated, replacing the sodium hydroxide with a stoichiometrical amount of triethylamine. The ditriethylamine salt of 2-amino-5-chloro-4-tolyl phosphonic acid is obtained. The product is a water-soluble solid.

The triethylamine is replaced by a stoichiometrical equivalent of trimethylamine or triethanolamine, the corresponding amine salts being obtained and constituting white solids which are soluble in water.

*Example 6*

The procedure of Example 2 is repeated, using half as much sodium hydroxide. The mono-sodium salt of 2-amino-5-chloro-4-tolyl phosphonic acid is obtained.

The corresponding mono-salts of potassium, ammonium, and triethylamine are produced by replacing the sodium hydroxide with its stoichiometrical equivalents of potassium hydroxide, ammonium hydroxide and triethylamine, respectively.

*Example 7*

To a solution in 250 parts of water 26.5 parts of the disodium salt of 2-amino-5-chloro-4-tolyl phosphonic acid prepared as described in Example 2 there is added 14 parts of calcium chloride dissolved in 50 parts of water. The mixture is stirred until the calcium salt of 2-amino-5-chloro-4-tolyl phosphonic acid precipitates out. After precipitation is complete, the slurry is filtered, recovering the calcium salt in the form of a solid.

*Example 8*

The procedure of Example 7 is followed, replacing the calcium chloride with a stoichiometrical equivalent of barium chloride. The barium salt precipitates out and is recovered by filtration as described in the preceding example.

When the barium chloride is replaced by magnesium chloride or zinc chloride in the above-described procedure, the corresponding magnesium and zinc salts are obtained. They are all white solids having little, if any, solubility in water.

*Example 9*

A solution of 22.2 parts of 2-amino-5-chloro-4-tolyl phosphonic acid in 300 parts of water plus 50 parts of 5 N sodium hydroxide solution is cooled to 0° by icing. 36 parts of concentrated hydrochloric acid and sufficient ice water are added to give a volume corresponding to the volume of 600 parts of water. 7 parts of sodium nitrite is added and after the diazotization is finished the excess nitrous acid is destroyed with sulfonic acid.

The solution of the coupling component is prepared by dissolving 15 parts of β-naphthol in 20 parts water and 26 parts of 5 N sodium hydroxide solution; it is added to a solution of 16 parts of sodium carbonate in 500 parts of water.

The diazo solution is quickly added to the β-naphthol solution, both solutions having been kept at low temperature by icing. The red sodium salt of the azo dye precipitates and the slurry is stirred until precipitation is complete. Thereupon the dye is recovered by filtration. In the form of its free acid it has the following formula:

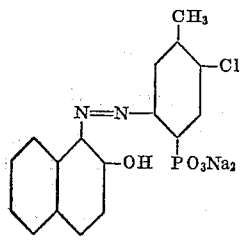

Example 10

A solution of 9.8 parts of barium chloride dihydrate in 75 parts of water is added to an aqueous slurry of the product of Example 9 containing 7.5 parts of the real dye calculated as the free acid in 250 parts of water. The addition is at room temperature and after all of the barium chloride has been added, the reaction mixture is slowly heated to the boiling point and maintained there for a short time until lake formation is complete. Cold water is then added, and the barium lake filtered off and washed with water.

Example 11

The procedure of Example 10 is repeated, replacing the 9.8 parts of barium chloride dihydrate with 4.9 parts of calcium chloride. The calcium lake is obtained.

Example 12

The procedure of Example 10 is repeated, replacing the barium chloride with 10 parts of cadmium chloride containing 2½ mols of water of crystallization. A cadmium lake is obtained.

Example 13

A solution of 1.5 parts of rosin in 25 parts of water and sufficient sodium hydroxide to dissolve the rosin is added to the slurry of the compound of Example 9, the slurry containing 7.5 parts of real dye, calculated as the free acid, in 250 parts of water. To the solution there is then added 12.2 parts of barium chloride dihydrate in 75 parts of water, and the slurry slowly heated to the boiling point. Boiling is continued for a short time until lake formation is complete, and cold water is then added. The pigment, which is a rosinated barium lake, is filtered off and washed with water.

Example 14

5 parts of the pigment of Example 13 were mulled into 8 parts of lithographic varnish under 150 lbs. pressure producing a printing ink of a very transparent red. The portion of the ink is reduced with 80 parts of zinc oxide ink. The tint is a relatively yellow shade of red.

It will be noted that in the acids and salts described in the Examples 1–9 there are two cations connected to the phosphonic acid group. These cations may be the same or different monovalent cations or may be part of a polyvalent cation as in the case of Examples 8 and 9.

This application is in part a continuation of our copending application Serial No. 582,629, filed May 4, 1956, and now abandoned.

We claim:

1. A compound of the following formula

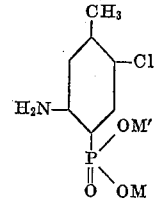

in which M is a cation and M' is a cation.

2. 2-amino-5-chloro-4-tolyl phosphonic acid.
3. An alkali metal salt of the acid of claim 2.
4. A salt of the acid of claim 2 with a metal of the second group of the periodic system.
5. An amine salt of the acid of claim 2.

References Cited in the file of this patent

UNITED STATES PATENTS

| | | |
|---|---|---|
| 2,229,049 | Dahlen et al. | Jan. 21, 1941 |
| 2,717,906 | Lecher et al. | Sept. 13, 1955 |
| 2,754,294 | Hein et al. | July 10, 1956 |